Inventor:
Frank J. Schuessler
By Robert F. Mielke, Atty.

Jan. 10, 1956 F. J. SCHUESSLER 2,730,571
MAGNETIC SOUND TRANSLATING APPARATUS
Filed Sept. 15, 1954 4 Sheets-Sheet 2
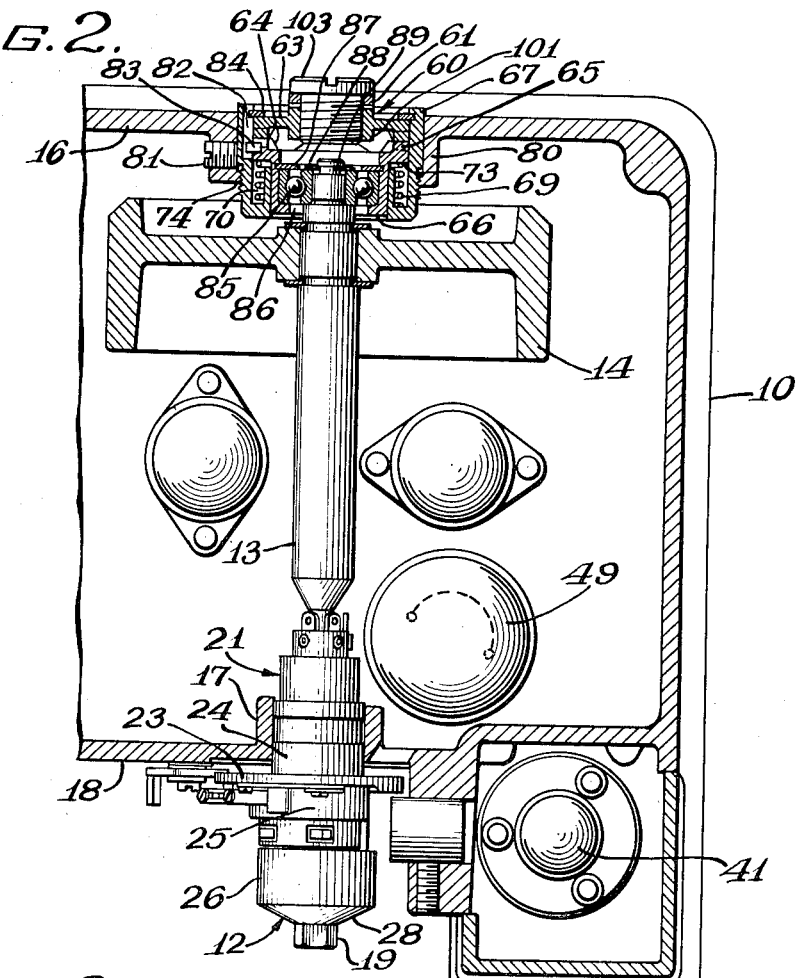
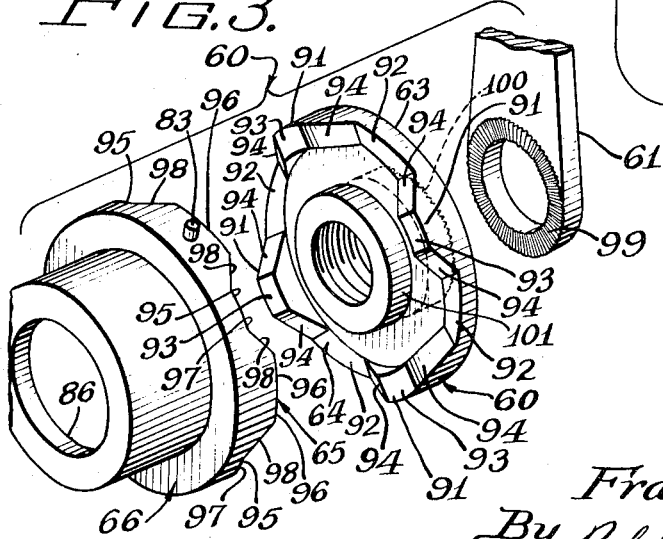
Inventor:
Frank J. Schuessler
By Robert F. Miehle, Jr. Atty.

Jan. 10, 1956 F. J. SCHUESSLER 2,730,571
MAGNETIC SOUND TRANSLATING APPARATUS
Filed Sept. 15, 1954 4 Sheets-Sheet 3

Inventor:
Frank J. Schuessler
By Robert F. Miehle
Atty.

Jan. 10, 1956  F. J. SCHUESSLER  2,730,571
MAGNETIC SOUND TRANSLATING APPARATUS
Filed Sept. 15, 1954  4 Sheets-Sheet 4
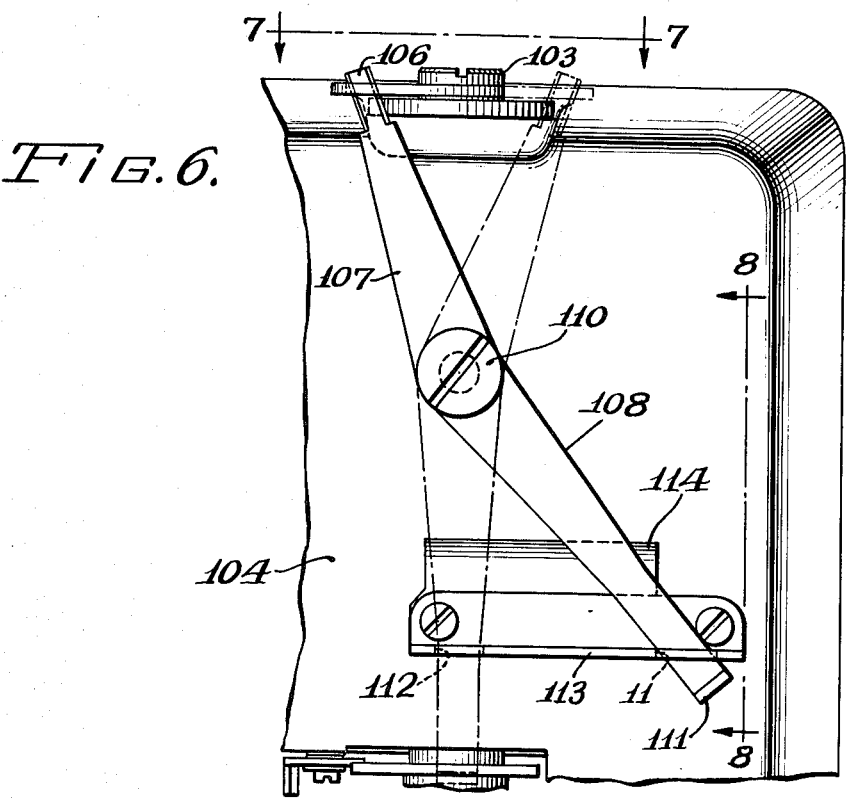
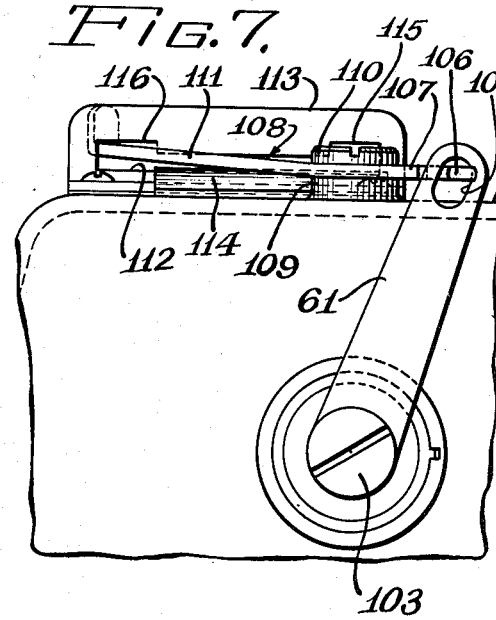
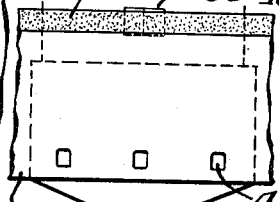
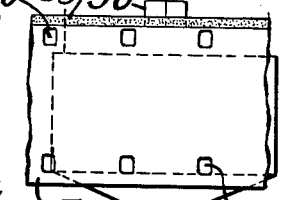
Inventor:
Frank J. Schuessler
By Robert F. Miehle, Jr.  Atty.

United States Patent Office 2,730,571
Patented Jan. 10, 1956

2,730,571

MAGNETIC SOUND TRANSLATING APPARATUS

Frank J. Schuessler, Chicago, Ill., assignor to Bell & Howell Company, Chicago, Ill., a corporation of Illinois Application September 15, 1954, Serial No. 456,095

12 Claims. (Cl. 179—100.2)

This invention relates to sound motion picture projectors and sound translating apparatus therefor, so arranged as to translate sound from various types and widths of sound tracks on motion picture film.

A principal object of my invention is to provide a magnetic sound translating apparatus arranged to selectively translate sound from magnetic sound tracks of varying widths.

Another object of my invention is to provide a novel and efficient magnetic sound translating apparatus, arranged to translate sound as efficiently from film strips having feed perforations along one edge thereof and having relatively wide sound tracks as from film strips having feed perforations along both edges thereof and having narrow sound tracks.

A further object of my invention is to provide a simple and compact magnetic sound translating apparatus, particularly adapted for motion picture projectors using motion picture film having a sound track along one edge thereof, and selectively operable to translate sound from sound tracks of various widths without impairing the quality of the sound translated.

Still another object of my invention is to provide a simple and efficient means particularly adapted for motion picture projectors for adapting the sound translating head of the projector to accommodate and translate sound from motion picture film having feed perforations extending along one or both edges thereof.

Still another object of my invention is to provide a sound translating apparatus accommodating the use of film having optical or magnetic sound tracks and selectively adjustable to translate sound from magnetic sound film having sound tracks of predetermined different widths.

These and other objects of my invention will apear from time to time as the following specification proceeds and with reference to the accompanying drawings wherein:

Figure 2 is a horizontal sectional view taken substantially along line 2—2 of Figure 1;

Figure 3 is an exploded perspective view showing the cam means for adjusting the sound translating apparatus for predetermined different widths of sound tracks;

Figure 6 is an enlarged partial detail plan view showing certain details of the mechanism for adjusting the guide drum and sound translating head for predetermined different widths of sound tracks;

Figure 7 is a partial end view looking substantially along line 7—7, of Figure 6;

Figure 8 is a partial sectional view taken substantially along line 8—8 of Figure 6;

Figure 9 is a plan view of a film having feed perforations extending along one edge thereof and a magnetic sound record extending along the opposite edge thereof, and illustrating the relative position between the sound translating head and guide drum with respect to the film sound track when translating magnetic sound; and Figure 10 is a view somewhat similar to Figure 9 but showing the relative position of a film having feed perforations extending along each edge thereof with a magnetic sound track extending along the outside of one row of feed perforations and showing the relative position of the magnetic sound track with respect to the guide drum and translating head when translating sound from the narrower sound track.

Figure 1:
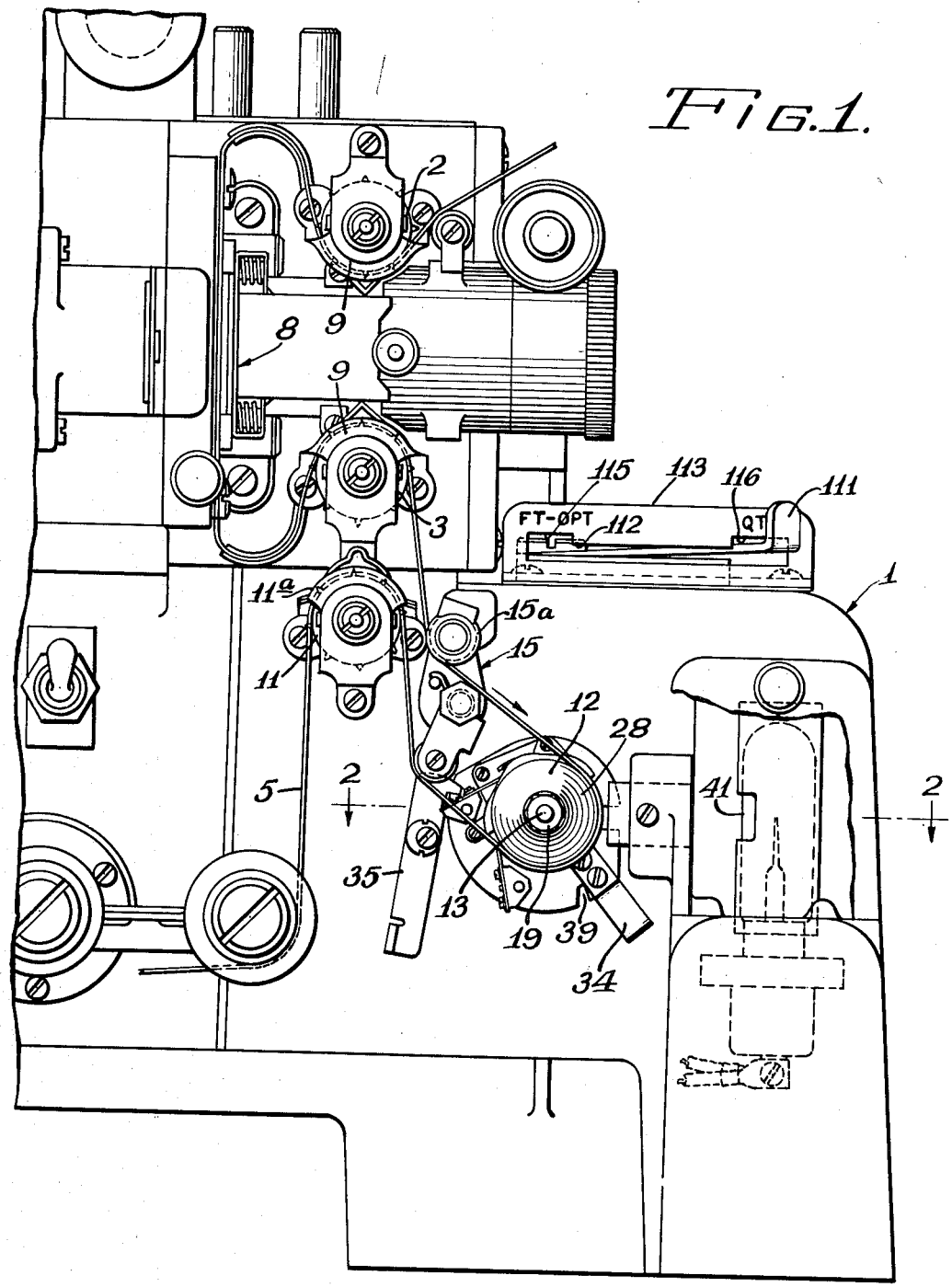
Figure 1 is a partial side elevation of a sound motion picture projecting machine, having a sound translating apparatus constructed in accordance with my invention embodied therein.

In Figure 1 of the drawings, I have shown a hollow casing 1 of a sound motion picture projecting machine having the usual motion picture projecting mechanism on the upper portion thereof and comprising two vertically spaced rotatable constant feed sprockets 2 and 3 which engage the usual feed perforations 4, extending along one edge of a sound and motion picture record bearing photographic film strip designated by reference character 5 in Figure 9 or similar feed perforations 6 of a sound and motion picture record bearing photographic film strip designated by reference character 7 in Figure 10. The feed sprockets 2 and 3 thus serve to constantly feed the film to and from a projection apertured intermittent feed guide 8, wherein the film is fed intermittently in a downward direction by the usual intermittent feed mechanism (not shown), the film being retained in engagement with sprockets 2 and 3 by the usual retaining devices 9.

It should here be understood that the feed sprockets 2 and 3, and the intermittent feed mechanism may be used for feeding either the film strip 5 or the film strip 7 and that when feeding the film strip 7 feed perforations 10 on the opposite side of the film from the feed perforations 6 are out of engagement with the feed sprockets and the intermittent feed mechanism and the film is fed in the same manner as the film 5 shown in Figure 9.

A third rotatable constant feed sprocket 11 is mounted on the casing 1 below the sprocket 3 and engages the film perforations of the film strips 5 or 7 for further constantly feeding the same. The film is retained in engagement with the sprocket 11 by the usual releasable retaining device 11a. The sprockets 2, 3 and 11 and the intermittent feed mechanism are driven in unison to feed the film strip at the same rate by the usual driving mechanism (not shown).

A "sound" drum 12 is rotatably mounted on a quill or shaft 13 journaled in the casing 1 for rotation about an axis parallel to the axes of rotation of the sprockets 2, 3 and 11. The shaft 13 is shown in Figure 2 as having a flywheel 14 suitably secured thereto, to rotate therewith and augment the momentum thereof, as in my Patent Number 2,678,357, dated May 11, 1954, and entitled "Magnetic Sound and Combined Optical and Magnetic Sound Translating Apparatus."

The sprockets 3 and 11 serve to feed the film strips 5 or 7 in the form of an open loop about the drum 12 and rotate said drum by engagement of the film therewith.

A tensioning device generally indicated at 15 engages the reaches of the loop of the film between the sprockets 3 and 11 and serves to frictionally engage the film strip about the drum 12 and to cooperate with the momentum of the drum and maintain an accurately uniform velocity of the film strip as it passes about the drum 12, this tensioning device including a flanged roller 15a which together with the sprockets 3 and 11 serve to laterally guide and maintain the film in a fixed position laterally thereof as it passes about the drum.

The shaft 13 is shown in Figure 2 as being journaled at its inner end in a rear wall 16 of the casing 1 and as extending through a front wall 18 of said casing and projecting outwardly therefrom. The drum 12 is secured to the outer end of the shaft 13 and is retained thereto as by a nut 19 threaded on the end of said shaft. The drum 12 is axially movable with respect to said walls with the shaft 13, as will hereinafter more clearly appear as this specification proceeds.

A carrier 21 is slidably and pivotally mounted in the front casing wall 18 for movement about the axis of the shaft 13 and in the direction of the axis of said shaft in an inwardly extending annular boss or flange 17 of the front wall 18. The carrier 21 is also provided with an axial bore 22 through which the shaft 13 extends. The carrier 21 has an intermediate radial flange 23 on the outside of the front casing wall 18 and has oppositely extending inner and outer axial hubs 24 and 25 respectively on opposite sides of the radial flange 23. The inner hub 24 is shown as being pivotally and slidably mounted in the inwardly extending annular flanged portion 17 of the casing wall 18.

Figure 4:
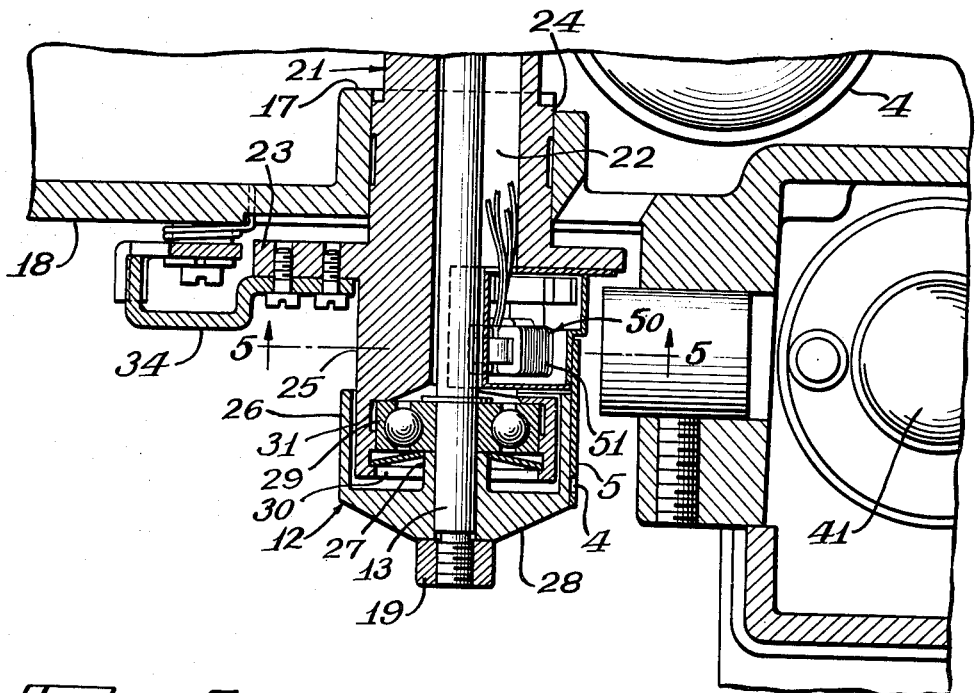
Figure 4 is an enlarged horizontal sectional view somewhat similar to Figure 2, but showing the guide drum for the film and sound translating head in horizontal section.
Figure 5:
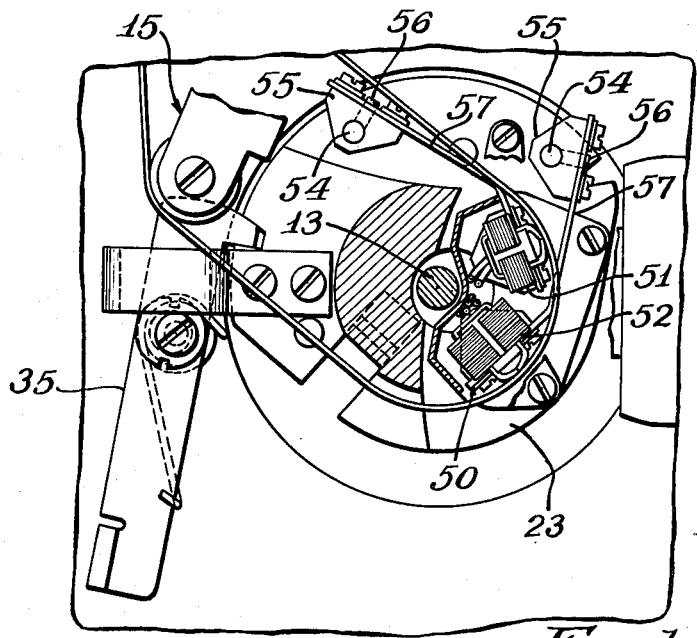
Figure 5 is a partial sectional view taken substantially along line 5—5, of Figure 4.

The drum 12 is shown as being hollow and as having a closed outer end 28, with a rim 26 extending inwardly therefrom about the outer end portion of the carrier hub 25. A radial and axial end thrust bearing 29 for the shaft 13 is shown in Figure 4 as being mounted within a hollow end portion 30 of the hub 25. The bearing 29 abuts a shouldered portion 31 of the hollow end portion of the hub 25 and is abutted by an inwardly extending hub 27 of the closed outer end 28 of the drum 12. Axial movement of the shaft 13 will thus effect axial movement of the carrier 21 and drum 12 in an obvious manner.

The drum 12 is adapted to guide either of the film strips 5 or 7 with the sound record portions thereof overhanging the inner end of the rim 26 of the drum, as shown in Figure 4.

In Figure 9 the feed perforations 4 extend along one edge of the film strip and a relatively wide magnetic sound record portion 32 extends along the opposite edge thereof. The photographic picture record portion of the film is between the feed perforations 4 and the sound strip 32 as is usual with such film.

The film strip 7, as shown in Figure 10 has the feed perforations 6 and 10 extending along opposite sides thereof, between which is the picture record portion of the film, and has a relatively narrow magnetic record portion 33, compared to the width of record portion 32, extending outwardly of the feed perforations 10.

The magnetic record portions 32 and 33 are finely divided granular magnetic materials bonded to the film strip as is well known to those skilled in the art and so are not herein shown or described further.

It may be seen with reference to Figures 4, 9 and 10 that the guide drum 12 is adapted to guide the film strip thereabout with the sound record portion of the film strip overhanging the inner end of the rim of the drum for cooperation of a sound translating device 50 with the sound record portion of the strip, and that in Figures 9 and 10 the inner edge of the sound translating device 50 extends only to the inner edge of the sound record portion of the film strip.

The flange 23 has a handle 34 projecting outwardly therefrom and affording a means for manually turning the carrier 21 about the axis of the shaft 13 to position electromagnetic heads 51 and 52 of the sound translating device 50 to engage the inner projecting edge of the film, and to move said electromagnetic heads out of engagement with the film and position an optical sound translation reflector (not shown) into position to reflect light projected through an optical sound record portion of a film (not shown) onto a usual photo-electric cell 49 within the casing 1, as shown and described in my Patent No. 2,678,357. Light is projected through the sound record portion of an optical film strip by the usual exciter lamp 41 on the front portion of the casing 1, to the sound translator reflector (not shown) reflecting the light onto the photo-electric cell 49 for translation into electrical impulses and into sound through a usual amplifier within the casing 1 and a loud speaker, and forming no part of my present invention, so this portion of the apparatus is not herein shown or described further.

The two electromagnetic heads 51 and 52 of the sound translating device 50 are mounted on the flange 23 of the carrier 21 in adjacently spaced relation about the pivotal axis of said carrier and are spaced from the optical sound translator reflector (not shown) about the pivotal axis of the carrier, for the selective positioning of the reflector and the electromagnetic heads in functioning position cooperative with the loop of the sound record portion of the film strip at the drum 12, when the carrier is positioned in its different pivotal positions as established by a latch lever 35 and the carrier flange notches 39, as in my aforementioned prior Patent No. 2,678,357 and as shown in Figure 1.

The mounting of each electromagnetic head on the carrier flange 23 is like that shown in my Patent No. 2,678,357 and comprises a forwardly projecting stud 54 fixed on the carrier flange 23 and having a support block 55 pivotally mounted thereon and retained in position with respect thereto as by a set screw 56. A spring arm 57 is shown as being secured at one of its ends to the support block 55 and as extending in a radial plane of the axis of the drum 12 inwardly of the inner edge of the film spring and as having an electromagnetic head 51 or 52 secured thereto.

When the electromagnetic heads 51 and 52 are in functioning position, the fed film strip first passes the head 51 and then the head 52. The head 51 constitutes an "erase" head which is energized from a high frequency source to condition the magnetic sound record portion of the film strip for recording or to erase a recording on the magnetic sound record portion of the film strip preparatory to placing another recording thereon, and the head 52 constitutes a magnetic translator head, which for magnetically recording on the magnetic sound record portion of the film strip, is connected to the output of an amplifier for recording sound impulses impressed on the input of the amplifier, and which, for reproducing from a magnetic sound record on the magnetic sound record portion of the film strip, is connected to the input of the amplifier for reproducing a sound record through a loud speaker (not shown) connected to the output of the amplifier.

Referring now in particular to the means for adjusting the drum 12 and translating heads 51 and 52 relative to the film strip, to provide the same relative position of the inner end of the drum and translating heads with respect to the edge of either of the sound tracks 32 or 33, depending upon whether the film 5 or the film 7 is being used, the shaft 13, carrier 21 and drum 12 as well as the translating heads 51 and 52 are axially moved as a unit by a cam mechanism 60 operated by a lever 61 operable through a lever mechanism from the operator's side or front of the machine.

The cam mechanism 60 includes an outer rotatable cam member 63 having an inwardly facing annular cam face 64 engageable with a corresponding annular cam face 65 of an inner cam member 66, restrained from rotatable movement and forming an axially movable carrier for the inner end of the shaft 13. The outer cam member 63 is pivotally movable within a carrier 67 to axially move the inner cam member 66 along the carrier 67 against the bias of a compression spring 69. The compression spring 69 is seated in an annular recess 70 formed in the carrier 71 and engages under a shoulder or flange 73 of the inner cam member 66.

The carrier 67 is shown as extending within an aperture formed by an annular boss or flange 80 extending inwardly of the rear wall 16 of the casing 1, and as having threaded engagement with a threaded inwardly extending inner end portion 74 of said flange, to afford a means for adjusting the position of said carrier axially of the shaft 13 with respect to the walls 16 and 18 of the casing 1, a set screw 81, screwthreaded through the boss 80 and engaging the carrier 67, serving to secure this carrier in adjusted position. The inner wall of the carrier 67 is shown as having an axial slot or groove 82 extending therealong for a portion of the length thereof. The groove 82 is engaged by a pin 83 secured to and extending outwardly from the inner cam member 66, to hold said cam member from rotation and effect axial movement of said cam member upon rotatable movement of the cam member 63.

A retaining ring 84 which may be a spring steel snap ring is shown as being snapped within an inner recessed portion of the inner wall of the carrier 67 to retain the cam member 63 to said carrier member.

The shaft 13, carrier 21 and drum 12 are axially moved with the cam member 66 or held in position thereby through a radial and end thrust bearing 85, herein shown as being a ball bearing taking axial thrust in opposite directions and also taking radial thrust of the inner end of the shaft 13. The ball bearing 85 is shown as being seated within a shouldered portion 86 of the cam member 66. A snap ring 87 is shown as being recessed within the inner wall of the cam member 66 and as engaging the outer race of the ball bearing 85, while a snap ring 88 is shown as being snapped on the end of the shaft 13 and as extending within a grooved portion 89 of said shaft, to retain the bearing 85 in the cam member 66 and effect axial movement of said bearing as well as the shaft 13 upon axial movement of said cam member 66.

The annular cam face 64 of the cam member 63, as shown in Figure 3, is provided with a plurality of equally angularly spaced cam projections 91 separated by low dwell portions 92, and each cam projection comprises a high dwell portion 93 arranged between inclined portions 94. The annular cam face 65 of the cam member 66 which opposes the cam face 64 of the cam member 63, is provided with a like plurality of equally angularly spaced cam recesses 95 separated by high dwell portions 96, and each cam recess comprises a low dwell portion 97 arranged between inclined portions 98.

The cam projections 91 of the cam member 63 are engageable in the cam recesses 95 of the cam member 66 when the cam members are in a certain angular relation, in which case the spring 69 will bias the cam member 66 into its retracted position with the low and high dwell portions 92 and 93 of the cam member 63 respectively opposing the high and low dwell portions 96 and 97 of the cam member 66. With the cam members in such relation the drum 12 and the electromagnetic heads 51 and 52 of the sound translating device 50 are in an inner position with respect to the wall 18 of the casing 1.

When, however, the cam member 63 is rotated relative to the cam member 66 from the above mentioned position, to cam the cam projections 91 out of the respective cam recesses 95 and position the cam member 63 with the high dwell portions 93 thereof in opposing relation with the high dwell portions 96 of the cam member 66, the drum 12 and the electromagnetic heads 51 and 52 of the sound translating device 50 are in an outer position with respect to the wall 18 of the casing 1.

Noting that the film as it passes about the drum 12 is laterally guided and thus maintained in a fixed position laterally thereof, as hereinbefore described, adjustment of the drum and the electromagnetic heads 51 and 52 axially of the drum and shaft 13, as effected by the cam members 63 and 66, effects predetermined selective positioning of the drum and electromagnetic heads together laterally of and relative to the film strip, and the arrangement is such that in the aforesaid inner position of the drum and electromagnetic heads they are positioned relative to the film strip 7, as shown in Figure 10, for cooperation of the electromagnetic heads with the sound track 33 of this film strip, the electromagnetic heads being disposed on the outside of the perforations 10 and overlying the sound track and the inner end of the drum being disposed closely adjacent the inner edge of the sound track 33 for proper support of the film strip as it passes the electromagnetic heads, and in the aforesaid outer position of the drum and electromagnetic heads they are positioned relative to the film strip 5, as shown in Figure 9, for cooperation of the electromagnetic heads with the sound track 32 of this film strip, the electromagnetic heads overlying the sound track and the inner end of the drum being disposed closely adjacent the inner edge of the sound track 32 for proper support of the film strip as it passes over the electromagnetic heads.

Thus, the selective positioning of the drum 12 and the electromagnetic heads 51 and 52 together by means of the cam members 63 and 66, provides for effecting the same relative positioning of the end of the drum, which the sound track portion of the film strip overhangs, and of the electromagnetic heads with the inner edge of different widths of sound tracks, for example, the relatively wide sound track 32 of the film strip 5 and the relatively narrow sound track 33 of the film strip 7, so that in either case the film strip is desirably supported by the drum immediately adjacent the sound track thereof as the film strip passes the electromagnetic heads, and in the case of the film strip 7, the electromagnetic heads are disposed outside of the feed perforations 10, so as to minimize distortion of or interference with the sound translation by these feed perforations.

The operating lever 61 is shown as having a plurality of radial serrations 99 engageable with corresponding serrations 100 formed in a hub 101 of the cam member 63, for rotatably turning the cam member 63 upon rotatable movement of the operating lever 61. A machine screw 103 threaded within the hub 101 of the cam member 63 and abutting the outer side of the operating lever 61 at its head, is provided to retain the serrations 99 of the operating lever 61 in driving engagement with the serrations 100 of the cam member 63.

The lever 61 is shown in Figures 6 and 7 as extending angularly upwardly from the cam member 63 above a shelf portion 104 of the casing 1 in advance of the film projecting mechanism. The lever 61 has an elongated slot 105 formed in its upper end portion, through which slidably extends a reduced end portion 106 of an arm 107 of a lever 108.

The lever 108 rests on a boss 109 projecting upwardly from the shelf portion 104 of the casing 1 and is pivoted thereto intermediate its ends on a pivot pin 110 threaded into said boss.

The lever 108 also has an arm 111 which extends from the pivot pin 110 toward the front of the machine through an elongated slot 112 formed in an index and locking plate 113, secured to the shelf 104 and extending upwardly therefrom in generally parallel relation with respect to the front wall 18 of the casing 1.

As herein shown, the lever arm 111 is resilient and slides along and is engaged by a leaf spring member 114 extending inwardly and angularly upwardly from the index plate 113. The spring 114 yieldably holds the arm 111 into engagement with either of two downwardly opening notches 115 or 116 opening into the slot 112 at opposite ends thereof and locking the lever 108 and the cam member 63 in their two positions of adjustment, and thus locking the drum 12 and translating heads 51 and 52 in position to efficiently reproduce sound from the magnetic film track 32 on the film 5, or from the magnetic film track 33 on the film 7.

When the arm 111 is in engagement with the notch 115, as shown in Figures 1, 6 and 7, the cam member 63 is positioned so that its high dwell portions 93 oppose the high dwell portions 96 of the cam member 66 and consequently the drum 12 and electromagnetic heads 51 and 52 are positioned relative to the film strip, as shown in Figure 10, for cooperation of the electromagnetic heads with the relatively narrow sound track 33 of the film strip 7. When the arm 111 is in engagement with the notch 116, as shown in dot and dash lines in Figure 6, the cam member 63 is positioned so that its cam projections 91 are engaged in the cam recesses 95 of the cam member 66 with the low and high dwell portions 92 and 93 of the cam member 63 respectively opposing the high and low dwell portions 96 and 97 of the cam member 66 and consequently the drum 12 and electromagnetic heads 51 and 52 are positioned relative to the film strip, as shown in Figure 9, for cooperation of the electromagnetic heads with the relatively wide sound track 32 of the film strip 5.

It may be seen from the foregoing that I have provided a simple arrangement for enabling a sound projector to use and translate sound from film having the feed perforations on one edge only and having a relatively wide sound record track, from film having an optical sound track, or from film having feed perforations extending along each edge of the film and having a relatively narrow sound record track, and that the drum 12 and sound translating heads 51 and 52 may be selectively positioned in a simple manner to efficiently translate sound from either the narrow or wide sound record tracks by operation of the lever 108 from the front, or operator's side of the projector.

It will be understood that modifications and variations of the present invention may be effected without departing from the spirit and scope of the novel concepts thereof.

I claim as my invention:

1. In a magnetic sound translating apparatus, the combination of a rotatably mounted guide drum adapted for guiding a longitudinally fed laterally guided magnetic record strip thereabout in the form of a loop and having a magnetic sound track on an edge portion of said strip overhanging an end portion of said drum, a magnetic sound translating head cooperative with said sound track at and inwardly of said loop, and means for adjusting said drum and head together axially thereof and relative to said strip to provide substantially the same relative positioning of said drum end and sound translating head with the inner edge of different widths of sound tracks.

2. In a magnetic sound translating apparatus, the combination of a rotatably mounted guide drum adapted for guiding a longitudinally fed laterally guided record strip thereabout in the form of a loop and with a magnetic sound track on an edge portion of said strip overhanging an end of said drum, a magnetic sound translating head cooperative with sound track at and inwardly of said loop, and means for predeterminately adjusting said drum and translating head in fixed relation axially of said drum and relative to said strip to provide substantially the same relative positioning of said drum end and translating head with the inner edge of predetermined different widths of said sound track.

3. In a magnetic sound translating apparatus, the combination of a casing, a rotatably mounted shaft extending within said casing and projecting outwardly through an aperture in a wall thereof, a guide drum spaced outwardly from said casing wall and mounted on the projecting end of said shaft for rotation therewith and adapted for guiding a longitudinally fed laterally guided magnetic sound record strip thereabout in the form of a loop and with a magnetic sound track on an edge portion of said strip overhanging the inner end of said drum, a first carrier arranged inwardly of said drum and mounted on said casing wall for movement axially of said shaft, an axial and radial thrust bearing between said shaft and carrier, a magnetic sound translating head mounted on said first carrier and cooperative with said sound track at and inwardly of said loop, a second carrier mounted on a wall of said casing opposite said first mentioned wall for movement axially of said shaft, an axial and radial thrust bearing between said second mentioned carrier and said shaft, a flywheel within said casing and secured on said shaft between said bearings, and means for adjusting said second carrier axially of said shaft and relative to said strip to provide substantially the same relative positioning of said drum end and sound translating head with the inner edge of different widths of said sound track.

4. In a magnetic sound translating apparatus, the combination of a casing, a rotatably mounted shaft extending within said casing and projecting outwardly through an aperture in a wall thereof, a guide drum spaced outwardly from said casing wall and mounted on the projecting end of said shaft for rotation therewith and adapted for guiding a longitudinally fed laterally guided magnetic sound record strip thereabout in the form of a loop and with a magnetic sound track on an edge portion of said strip overhanging the inner end of said drum, a first carrier arranged inwardly of said drum and mounted on said casing wall for movement axially of said shaft, a radial and axial end thrust bearing between said shaft and carrier, a magnetic sound translating head mounted on said first carrier and cooperative with said sound track at and inwardly of said loop, a second carrier mounted on a wall of said casing opposite said first mentioned wall for movement axially of said shaft, a radial and axial end thrust bearing between said second mentioned carrier and said shaft, and cam means selectively operable to move said second carrier shaft, drum and magnetic sound translating head axially of said shaft and relative to said record strip, to provide substantially the same relative positioning of said drum end and sound translating head with the inner edge of different widths of sound track.

5. In a magnetic sound translating apparatus, the combination of a casing, a rotatably mounted shaft extending within said casing and projecting outwardly through an aperture in a wall thereof, a guide drum spaced outwardly from said casing wall and mounted on the projecting end of said shaft for rotation therewith and adapted for guiding a longitudinally fed laterally guided magnetic sound record strip thereabout in the form of a loop and with a magnetic sound track on an edge portion of said strip overhanging the inner end of said drum, a first carrier arranged inwardly of said drum and mounted in said casing for movement axially of said shaft, an axial and radial thrust bearing between said shaft and carrier, a magnetic sound translating head mounted on said first carrier and cooperative with said sound track at and inwardly of said loop, a second carrier mounted on a wall of said casing opposite said first mentioned wall for movement axially of said shaft, a radial and axial end thrust bearing between said second mentioned carrier and said shaft, cooperating rotatable and axially movable cam means for axially moving said shaft and adjusting said second carrier relative to said strip to provide substantially the same relative positioning of said drum end with the inner edge of different widths of said sound track, and lever means operable from a position adjacent said drum for actuating said cam means to move said shaft drum and sound translating head in the direction of the axis of said shaft.

6. In a magnetic sound translating apparatus, the combination of a casing, a rotatably mounted shaft extending within said casing and projecting outwardly through an aperture in a wall thereof, a guide drum spaced outwardly from said casing wall and mounted on the projecting end of said shaft for rotation therewith and adapted for guiding a longitudinally fed laterally guided magnetic sound record strip thereabout in the form of a loop and with a magnetic sound track on an edge portion of said strip overhanging the inner end of said drum, a first carrier arranged inwardly of said drum and mounted on said casing wall for movement axially of said shaft, an axial and radial thrust bearing between said shaft and carrier, a magnetic sound translating head mounted on said first carrier and cooperative with said sound track at and inwardly of said loop, a second carrier mounted on a wall of said casing opposite said first mentioned wall for movement axially of said shaft, an axial and radial thrust bearing between said second mentioned carrier and said shaft, a flywheel within said casing and secured on said shaft between said bearings, a rotatable cam having operative connection with said axial and radial thrust bearing for axially moving the same and adjusting said second carrier and drum to provide substantially the same relative positioning of said drum end with the inner edge of different widths of said sound track, and lever means for operating said cam means from said side of the machine adjacent said drum.

7. In a magnetic sound translating apparatus, the combination of a casing having spaced side walls, a shaft mounted in said side walls for rotatable and axial movement with respect thereto and projecting outwardly beyond one of said side walls, a guide drum on the projecting end of said shaft for guiding a longitudinally fed laterally guided record strip trained thereabout in the form of a loop with an edge portion having a magnetic sound track thereon overhanging an inner end portion of said drum, a magnetic sound translating head cooperating with said sound track inwardly of said loop, and means operable from the side of said casing adjacent said drum and having engagement with the end portion of said shaft opposite from said drum for moving said drum and sound translating head together axially thereof and relative to the record strip.

8. In a magnetic sound translating apparatus, the combination of a casing having spaced side walls, a shaft mounted in said side walls for rotatable and axial movement with respect thereto and projecting beyond one of said side walls, a guide drum on the projecting end of said shaft for guiding a longitudinally fed laterally guided record strip passing thereabout in the form of a loop with and edge portion having a magnetic sound track thereon overhanging an inner end portion of said drum, a magnetic sound translating head cooperating with said sound track at and inwardly of said loop, and means for axially moving said shaft and adjustably moving said drum and sound translating head in accordance with the width of the sound track on said film and maintaining the sound track in overhanging relation with respect to said drum regardless of the width thereof.

9. In a magnetic sound translating apparatus, the combination of a casing having spaced side walls, a shaft mounted in said side walls for rotatable and axial movement with respect thereto and projecting beyond one of said side walls, a guide drum on the projecting end of said shaft for guiding a longitudinally fed laterally guided record strip passing thereabout in the form of a loop with an edge portion having a magnetic sound track thereon overhanging an inner end portion of said drum, a magnetic sound translating head cooperating with said sound track at and inwardly of said loop, and means for adjustably moving said drum and sound translating head in accordance with the width of the sound track on said film and maintaining the sound track in overhanging relation with respect to said drum regardless of the width thereof, comprising a rotatable cam retained against axial movement, a non-rotatable axially guided cam having cooperative engagement with said rotatable cam and forming a carrier for an end portion of said shaft, and an operative connection between said non-rotatable axially guided cam and said shaft for axially moving said shaft upon rotatable movement of said rotatable cam.

10. In a magnetic sound translating apparatus, the combination of a casing having spaced side walls, a shaft mounted in said side walls for rotatable and axial movement with respect thereto and projecting beyond one of said side walls, a guide drum on the projecting end of said shaft for guiding a longitudinally fed laterally guided record strip passing thereabout in the form of a loop with an edge portion having a magnetic sound track thereon overhanging an inner end portion of said drum, a magnetic sound translating head cooperating with said sound track at and inwardly of said loop, and means for adjustably moving said drum and sound translating head in accordance with the width of the sound track on said film and maintaining the sound track in overhanging relation with respect to said drum regardless of the width thereof comprising a rotatable cam guided in the opposite side wall of said casing from said drum for pivotal movement with respect thereto, an axially guided cam in association with said rotatable cam, means biasing said cams in engagement with each other, a radial and end thrust bearing carried in said axially guided cam and forming a bearing and end thrust mounting for the opposite end of said shaft from said drum, and means operable from the same side of said casing as said drum for rotating said rotatable cam and axially moving said shaft and selectively positioning said drum and sound translating head in sound translating positions with predetermined varying widths of sound track.

11. In a magnetic sound translating apparatus, the combination of a rotatably mounted guide drum adapted for guiding a longitudinally fed laterally guided magnetic record strip thereabout in the form of a loop and with a magnetic sound track on an edge portion of said strip overhanging an end of said drum, a magnetic sound translating head cooperative with said sound track at and inwardly of said loop, radial and end thrust bearing means for supporting said drum for rotatable and axial movement, means connected with said bearing means for axially moving said bearing means, drum and sound translating head and predeterminately adjusting said drum and sound translating head in fixed relation axially of said drum and relative to said strip to provide substantially the same relative positioning of said drum end and translating head with the inner edge of predetermined different widths of sound track.

12. In a magnetic sound translating apparatus, the combination of a rotatably mounted guide drum adapted for guiding a longitudinally fed laterally guided magnetic record strip thereabout in the form of a loop and with a magnetic sound track on an edge portion of said strip overhanging an end of said drum, a magnetic sound translating head cooperative with said sound track at and inwardly of said loop, radial and end thrust bearing means for supporting said drum, means connected with said bearing means for axially moving said bearing means, sound translating head and drum and predeterminately adjusting said drum and sound translating head in fixed relation axially of said drum and relative to said strip to provide substantially the same relative positioning of said drum end and translating head with the inner edge of predetermined different widths of said sound track comprising cooperating rotatable and axially movable cam means for axially moving said bearing means, a lever arm connected with said rotatable cam means for pivotally moving the same, and a second lever arm operable from the side of the machine adjacent said drum and having operative connection with said first lever arm.

No references cited.